May 8, 1962 G. R. GEHRKENS 3,033,497
BARRICADE STRAP FENCES
Filed Feb. 7, 1957
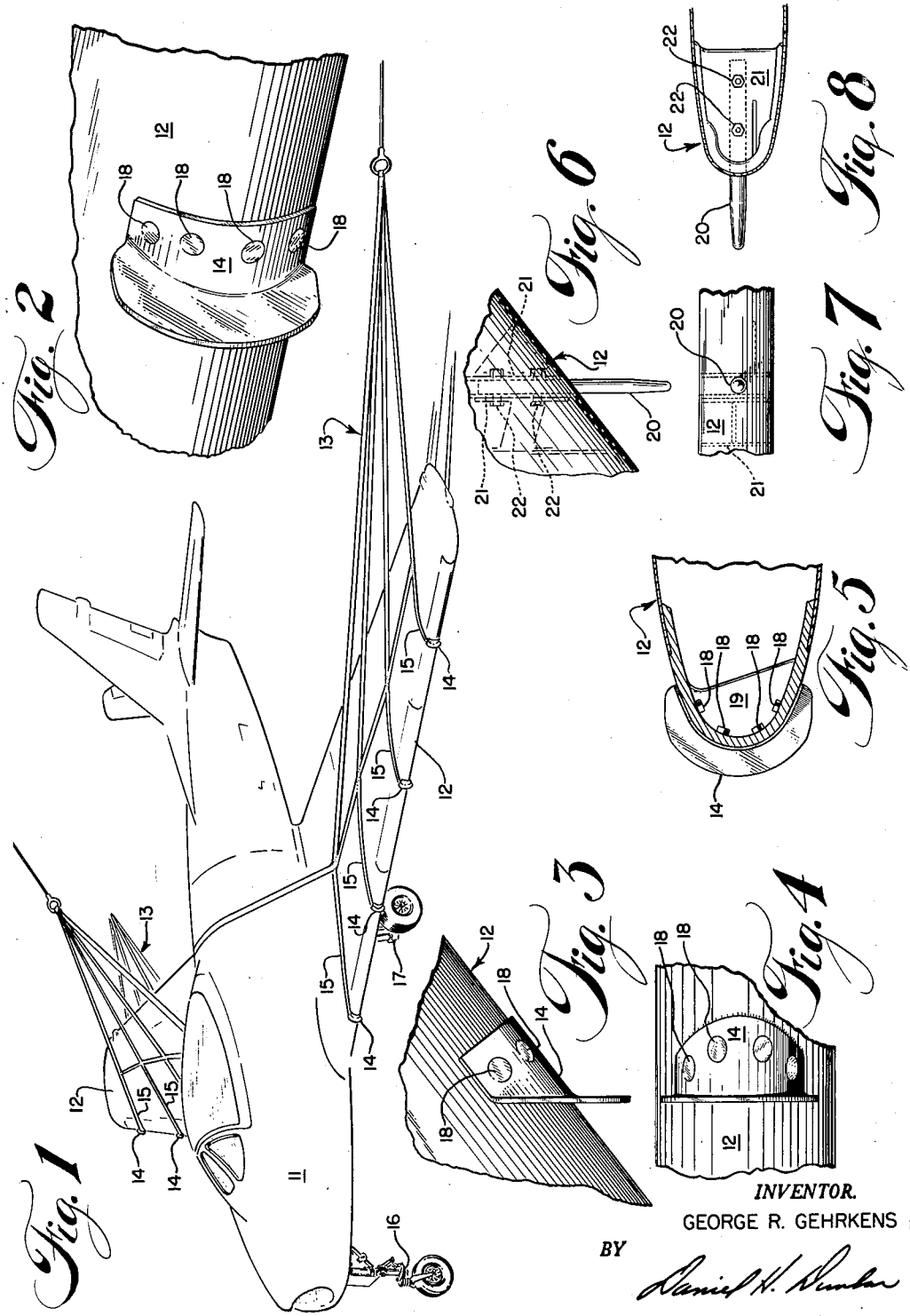
INVENTOR.
GEORGE R. GEHRKENS
BY
ATTORNEY

United States Patent Office 3,033,497
Patented May 8, 1962

3,033,497
BARRICADE STRAP FENCES
George R. Gehrkens, Columbus, Ohio, assignor to
North American Aviation, Inc.
Filed Feb. 7, 1957, Ser. No. 638,814
7 Claims. (Cl. 244—110)

This invention relates broadly to aircraft and more particularly to means which may be incorporated on aircraft to increase the effectiveness of supplementary motion-arresting equipment.

The use of net-type barricades to provide supplementary or emergency motion-arresting forces for landing aircraft is well-known. Such devices or arrangements are generally employed on naval aircraft carrier landing decks and often are located at the extremes of ground landing strips. When barricades are so employed it is anticipated that the landing speed of to-be engaged aircraft will be excessive in relation to the length of landing deck or landing strip immediately available and the inherent braking ability of the aircraft. Hence, the use of supplementary motion-arresting equipment becomes advisable to prevent damage or even complete loss of the aircraft.

Motion arresting equipment as a general rule can be made to perform satisfactorily. Such equipment may be combined with specially designed energy-absorbing engines or snubbing devices if arresting forces of extremely high magnitude are to be required. However, further problems have been created by the use of wing-engaging barricades for engagement with aircraft having swept-back wing design.

When an aircraft of such construction makes an engagement with a net-type barricade, individual strap components of the barricade are generally caused to slip along the leading edge of each wing member. Certain of the strap components may, at times, slip completely out of engagement with a previously engaged wing member; often the strap components slip toward the end of the wing so that the restraining forces become concentrated near the outboard extreme of the wing member.

Restraining forces of the magnitude usually encountered in barricade arrestments are excessive in relation to the structural strength of the wing member if they are concentrated and located adjacent the wing tip; under such conditions extreme damage to the wing member will ensue.

To overcome this difficulty I advocate the use of barricade strap fences which are mounted on and project forward from the leading edge of each swept-back wing member of an aircraft. Such fences, when properly designed and secured, are engageable with the vertical straps of a net-type aircraft barricade and when so engaged during a landing operation the barricade strap fences prevent the barricade straps from slipping along, off, and out of engagement with the aircraft wing member even though the aircraft approach might be either off-center or oblique.

Another object of my invention is to provide barricade strap fences of a type that will not measurably adversely affect an aircraft's flight performance or flight characteristics.

Another object of my invention is to provide barricade strap fences which will not potentially alter the designed boundary layer aircontrol pattern of the aircraft.

Still another object of my invention is to provide barricade strap fences which are sturdy and simple to manufacture and which may be readily installed on an aircraft.

Other objects and advantages of my invention will become more apparent during the course of the following description, particularly when taken in connection with the accompanying drawings.

In the drawings wherein like numerals are employed to designate like parts throughout the same:

FIG. 1 is a perspective view of an aircraft of swept-back wing design in engaged relationship with a barricade during its landing. The barricade strap fences of my invention are shown mounted on the leading edge of each wing member.

FIG. 2 is a perspective view of a fragmentary portion of an aircraft wing member leading edge showing the barricade strap fence of my invention in greater detail.

FIGS. 3, 4, and 5 are top, front elevational, and side elevational views respectively of the barricade strap fence and environmental structure shown in FIG. 2.

FIGS. 6, 7, and 8 are top, front elevational, and side elevational views respectively of an alternate form of my invention combined with fragmentary portions of the environmental aircraft structure.

In FIG. 1, aircraft 11 is shown with its wing members 12 in engagement with barricade 13. On the leading edge of each wing member, which is of swept-back design with reference to the axis of the aircraft, are located barricade strap fences 14. Each barricade strap fence 14 is shown as being in engagement with a strap component 15 of barricade 13. Strap components 15 are generally fabricated of canvas, woven nylon, or a like resilient material and are suspended vertically above the flight deck or landing strip prior to their engagement with a landing aircraft's wing members.

Barricade 13 may optionally be anchored at each extreme to either a rigid structure or to an energy-absorbing engine or the like. Such structure or devices are not shown in the drawing. Additionally, the extended nose landing gear 16 and the extended main landing gear 17 are ideally in continuous contact with the flight deck or landing strip during the landing operation.

As shown in FIGS. 2 through 5, a typical barricade strap fence 14 is preferably secured to the leading edge portion of wing member 12 by means of bolts 18. Other fastening means, such as rivets or welding, might alternately be utilized to secure barricade strap fences 14 to wing members 12. It should perhaps be pointed out that barricade strap fences 14 are preferably fabricated of high-strength aluminum alloy; other materials such as steel alloys and titanium alloys will also prove satisfactory.

FIG. 5 discloses typical internal structure of the leading edge portion of wing member 12 in somewhat greater detail. Barricade strap fence 14 is preferably located at or immediately adjacent the juncture of rib member 19 and the skin which comprises the leading edge surface of wing member 12. Bolts 18 may enter either rib member 19 or, as shown in FIG. 5, may pass only into or through the leading edge skin. Also, as shown in FIG. 5, the heads of bolts 18 are preferably ground flush with the contoured surface of barricade strap fence 14.

When barricade strap fences 14 are located and mounted on the wing member leading edge at points registering with or immediately adjacent to structural rib members, the arresting forces acting upon the wing members are effectively transmitted into the aircraft airframe, and when the barricade strap fences are mounted in spaced-apart relationship throughout the length of the leading edge of each wing member, these same arresting forces are so distributed as to prevent the damaging of structural components by concentrated stresses.

The barricade strap fences should preferably be symmetrically located relative to the axis of symmetry of the aircraft. That is, each barricade strap fence member of oppositely paired individual barricade strap fences should be located equally distant from the axis of symmetry of the aircraft.

An alternate form of barricade strap fence is illustrated at 20 in FIGS. 6, 7, and 8. Its intended function is identical to that of barricade strap fence 14. However, member 20 differs from member 14 in that it is particularly suited for use in conjunction with a wing member having a comparatively thin leading edge. The bearing surface available for the mounting of a barricade strap fence of the form shown at 14 in FIGS. 2 through 5 may sometimes be deemed inadequate for the intended purpose. To overcome this problem the barricade strap fence taking the form of 20 extends through the leading edge skin and is secured directly to a rib member such as 21. Bolt and nut assemblies 22 are shown as the means of securing barricade strap fence 20 to the aircraft structural component 21, however, other equivalent fastening means may be employed.

It should also be noted that the form of barricade strap fence shown at 20 is particularly well-suited to being made retractable so that it might be positioned fully within the profile extremes of the wing member leading edge surface. Not shown are the construction features such as mounting supports, linkages, actuators, and controls through which this particular objective may be readily attained.

It will hence be observed that the use of barricade strap fences in accordance with my teaching does much by way of improving the characteristics of net-type barricade arrestments of aircraft having swept-back wing design; this in turn minimizes damage to aircraft wing components. The use of barricade strap fences prevents the concentration of restraining forces at a location near the outboard ends of the wing member.

Because the barricade strap fences are located in a substantially uniform spaced-apart relationship along and throughout the length of the aircraft's wing member leading edges and because opposingly paired individual barricade strap fences are symmetrically balanced, the restraining forces initiated by the barricade arrangement are effectively and satisfactorily transmitted into the aircraft during on-center, off-center, and oblique engagements of aircraft with barricade.

Further, use of the barricade strap fences on sweptback wing aircraft in accordance with my teaching will not adversely affect the flight performance and flight characteristics inherent in the aircraft. As shown in the drawings, each form of barricade strap fence is so designed and located that its axis or plane of projection lies in a direction parallel to the longitudinal axis of the aircraft; that is, the orientation of the barricade strap fence is in a direction corresponding to the straight-flight path of the aircraft. As a result, the protruding portion of the barricade strap fence is obliquely located relative to the wing leading edge associated therewith. Likewise, because the barricade strap fences do not project into wing member surface areas beyond the leading edge portion they do not affect or alter the control of the boundary layer air conditions desired for the wing member.

In addition to substantially preventing damage to the outboard ends of the wing during heretofore encountered slippage of the barricade straps, the strap fences or detents of the present invention remove the possibility that the aircraft during landing will pass through the barricade and cause damage to other aircraft parked beyond the barricade and/or loss of the landing aircraft off the carrier deck. In those situations where an aircraft's landing hook has failed to make engagement with cable type barriers located forward of the net-type barricade, because of either hook failure or improper landing, the likelihood that the aforementioned damage will occur is more pronounced.

It is to be understood that the form of the invention herewith shown and described is to be taken as the preferred embodiment of the same, but that various changes in the shape, size and arrangement of parts may be resorted to without departing from the spirit of the invention or the scope of the subjoined claims.

I claim:

1. In an aircraft, wing members having swept-back leading edges, and barricade strap fences projected forward from each said leading edge, said barricade strap fences being fixedly connected to said wing members to thereby restrain engaged barricade straps from lateral motion along said leading edges.

2. The aircraft defined in claim 1, wherein said barricade strap fences are fixedly secured to said wing members in uniform spaced-apart relation, said spaced-apart relation being maintained substantially throughout the length of each said swept-back leading edge.

3. The aircraft defined in claim 1, wherein each said barricade strap fence is provided with an upper extreme and with a lower extreme, said upper and lower extremes being located within the maximum thickness of said wing members.

4. The aircraft defined in claim 1, wherein each said wing member is provided with internal reinforcing members, said barricade strap fences being fixedly connected to said internal reinforcing members by separate fastener means.

5. The aircraft defined in claim 1, wherein each said barricade strap fence is comprised of a first portion fixedly connected to said wing member and a second portion fixedly connected to and projected forward from said first portion, said first portion having a contoured surface corresponding to and bearing upon a swept-back leading edge, and said second portion being extended generally parallel the longitudinal axis of the aircraft.

6. The aircraft defined in claim 1, wherein each said wing member has internal structural members and has openings in said swept-back leading edges adjacent said structural members, each said barricade strap fence being connected to one of said internal structural members and being projected through a leading edge opening substantially parallel to the longitudinal axis of the aircraft.

7. The aircraft defined in claim 1, wherein each barricade strap fence secured to one wing member is opposed by a barricade strap fence secured to another wing member, each pair of said opposed barricade strap fences being located symmetrically with respect to the axis of longitudinal symmetry of the aircraft.

References Cited in the file of this patent

UNITED STATES PATENTS

| | | |
|---|---|---|
| 1,157,636 | Ogrissek et al. | Oct. 19, 1915 |
| 1,306,860 | Smith | June 17, 1919 |
| 2,649,265 | Grant | Aug. 18, 1953 |
| 2,885,161 | Kerker et al. | May 5, 1959 |

FOREIGN PATENTS

| | | |
|---|---|---|
| 617,498 | Great Britain | Feb. 7, 1949 |

OTHER REFERENCES

Aviation Week Magazine, page 4, November 19, 1956.